United States Patent Office 2,722,966
Patented Nov. 8, 1955

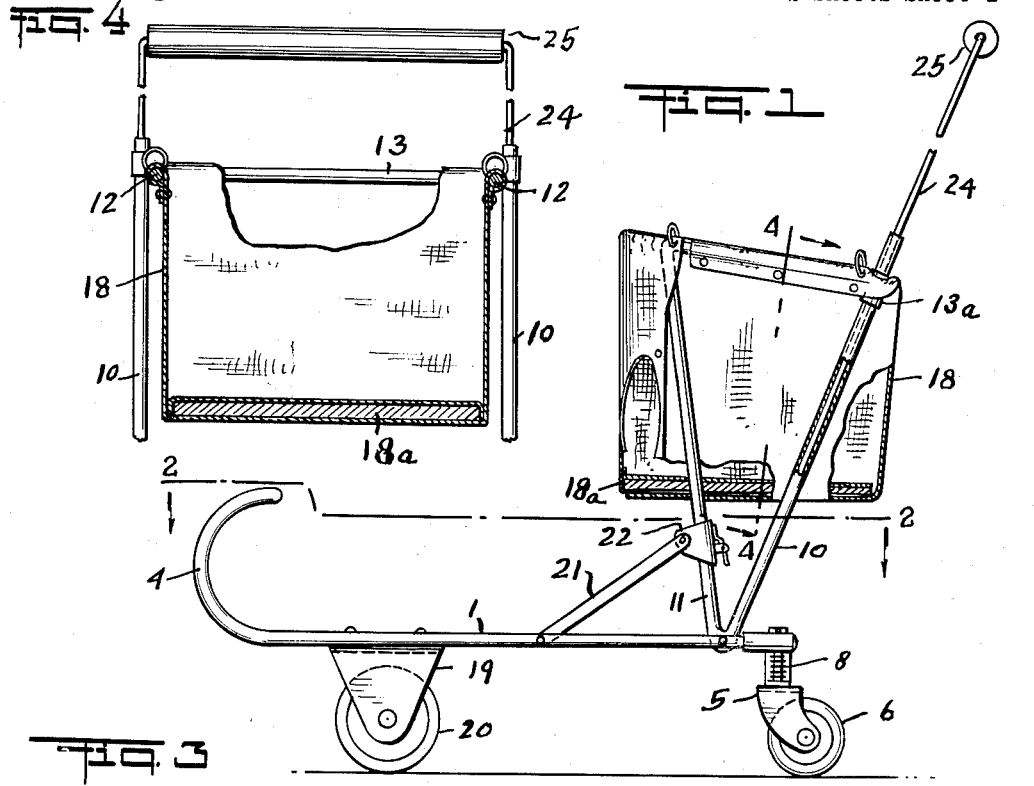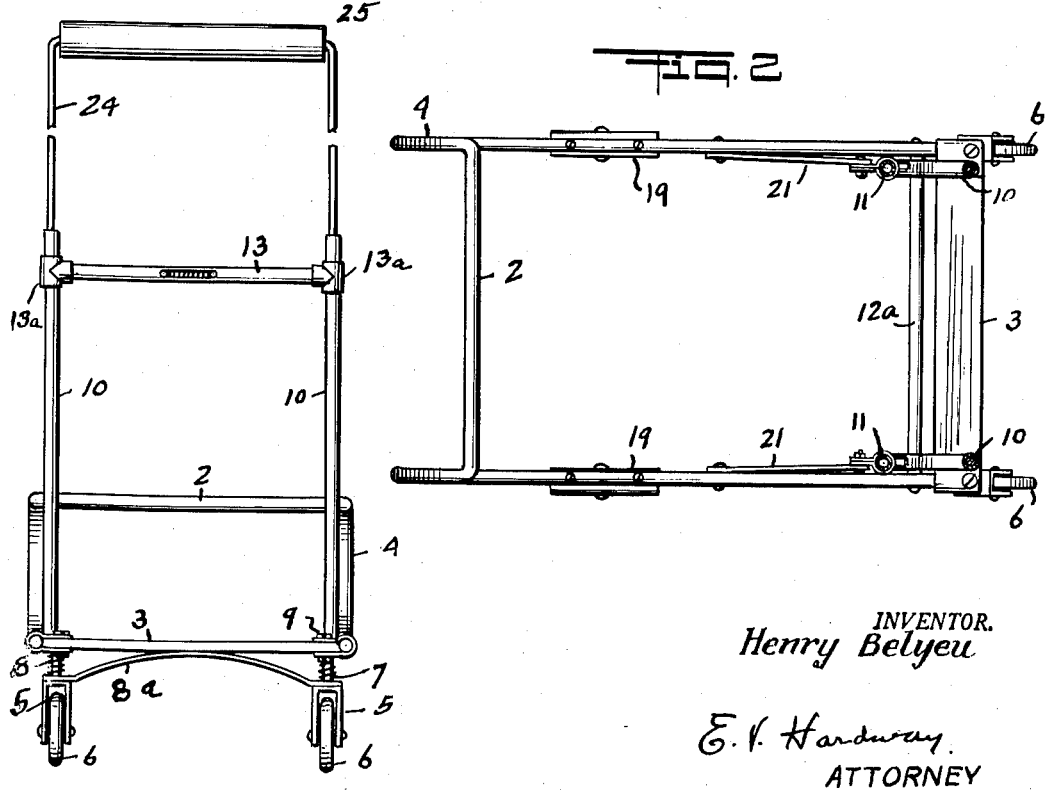

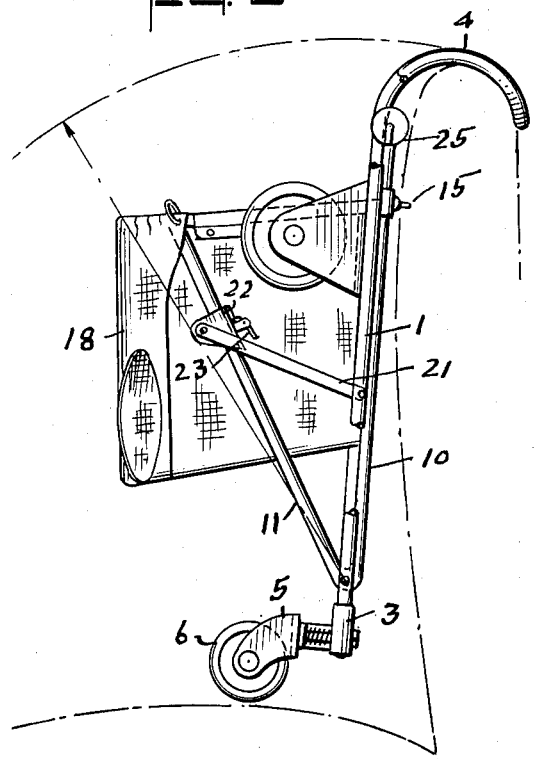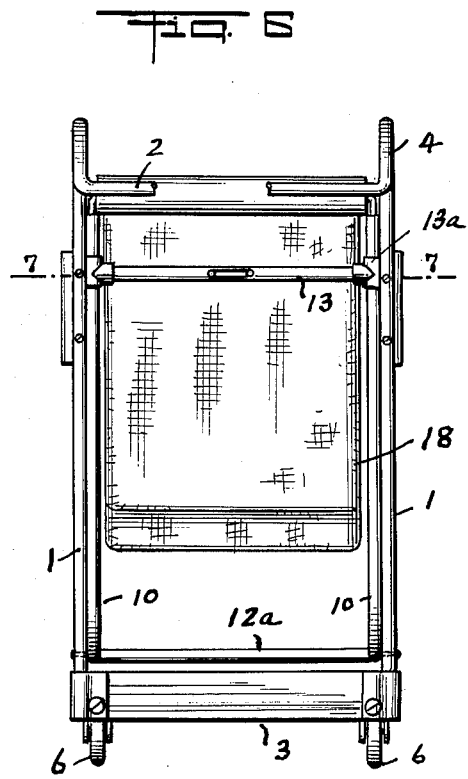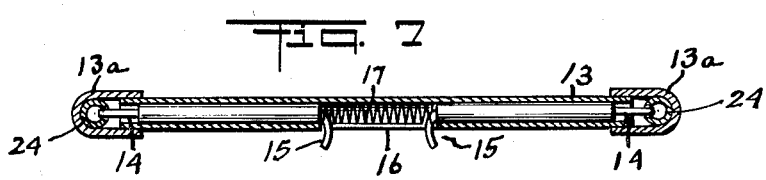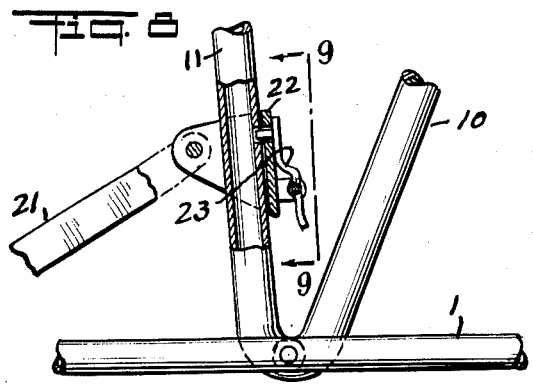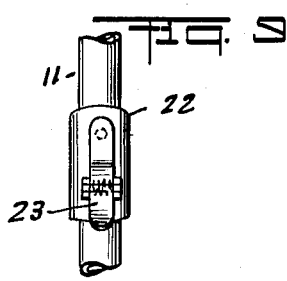
INVENTOR.
Henry Belyeu
BY
E. V. Harduray
ATTORNEY

2,722,966

SUPPLEMENTAL VEHICLE SEAT CONVERTIBLE TO A CARRIAGE

Henry Belyeu, Houston, Tex., assignor to David M. Simmans, Houston, Tex.

Application August 3, 1949, Serial No. 108,312

2 Claims. (Cl. 155—41)

This invention relates to a supplemental motor vehicle seat designed for use by small children.

The invention constitutes certain improvements over that type of seat disclosed in Patent Number 2,435,733, issued by the United States Patent Office to this applicant on February 10, 1948.

An object of the invention is to provide a seat of the character described which may be conveniently and safely suspended from the back of the conventional automobile seat and comfortably used by small children when so suspended; and the frame is of such construction that it may be readily converted into a carriage or push-cart for children in a more convenient and practical manner than the type of push-cart shown in said patent.

Other objects and advantages will be apparent from the following specification which is illustrated by the accompanying drawings, wherein:

Figure 1 is a side view of the device as converted into a carriage of the push-cart type.

Figure 2 is a plan view of the frame partly in section taken on the line 2—2 of Figure 1.

Figure 3 is a rear view of the frame.

Figure 4 is a front elevation thereof taken on the line 4—4 of Figure 1.

Figure 5 is a side elevation of the device converted into a supplemental motor vehicle seat.

Figure 6 is a rear view thereof.

Figure 7 is an enlarged transverse sectional view taken on the line 7—7 of Figure 6.

Figure 8 is an enlarged fragmentary side elevation of the frame;

Figure 9 is an enlarged fragmentary view of the frame viewed as indicated by 9—9 in Figure 8.

Referring now more particularly to the drawings, wherein like numerals of reference designate the same parts in each of the figures, the numerals 1, 1 designate the side bars of a U-frame and the numeral 2 designates the cross bar.

The free ends of the side bars 1, 1 are connected by means of a cross brace 3, and at its opposite end the frame is formed into a hook designated generally by the numeral 4 and which is shaped to conform to the contour of the top of the back rest of an automobile seat with the side bars 1, 1 resting against the back rest for support, as indicated in Figure 5.

There are the forks 5 on which the wheels 6 are mounted, each fork having a spindle 7, which extends vertically through end bearings of the brace 3, and around the spindles between the forks 5 and the brace 3 there are the shock absorbers in the form of coil springs 8 and said forks may be, if desired, connected by a flexible yoke 8a whose ends have bearings to receive the spindles 7, said ends resting on the forks 5 and the yoke supporting the bar 3.

Screwed onto the upper end of each spindle 7 there is a retaining nut 9.

When the device is used as an auxiliary seat the wheels 6 may rest upon the ordinary auto seat for additional support as indicated in Figure 5. There are the triangular side frames which are pivoted at one apex to the side bars 1, 1 as illustrated in Figure 1, said frames including the diverging side rods 10, 11 connected at their free ends by means of the corresponding cross rods 12, 12, and said pivoted apexes are connected by the transverse rod 12a.

The free ends of the side rods 10 are connected by a suitable cross rod 13 as shown in Figure 4.

The cross rod 13 is tubular as shown in Figure 7 and is provided with end couplings 13a, 13a which are connected in the side rods 10 and in the cross rod 13 are the oppositely disposed dogs 14, 14 whose outer ends are adapted to project beyond the ends of the cross rod 13 as illustrated in Figure 7, and the inner ends of said dogs are bent forming grips 15, 15 which work through a slot 16 in the rod 13 and a pressure spring 17 is mounted in said rod 13 between the dogs to hold them outwardly or in active position, the grips being provided to retract the dogs when desired.

There is a seat 18 which is formed of any suitable material such as fabric and whose side margins at the top are secured around the cross rods 12, 12, in any preferred manner, said seat swinging downwardly and being provided with a suitable substantially rigid bottom 18a and forward leg openings. This seat is suspended between said triangular side frames as shown in both Figures 1 and 5. This seat 18, however, may be of any selected shape and material.

Anchored to and extending at substantially right angles from the side bars 1 there are the brackets 19, 19. Mounted within these brackets are the carrier wheels 20. Pivotally mounted, at one end, on the side bars 1 are the links 21, 21 whose other ends are pivotally connected to the sleeves 22, 22 which are slidable on the respective side rods 11 and latched thereto by means of the spring latches 23 so that they will hold the side frames in vertical position, and when said latches are released, said sleeves may move along the side rods 11 to reverse position as shown in Figure 5.

When said sleeves 22 are latched to the side rods 11 as shown in Figure 8, the device will be used as a push-cart as shown in Figure 1, and when it is to be used as a supplemental motor vehicle seat the spring latches 23 will be released and the side frames will be moved toward the frame 1, 1 until the side rods 10 are in parallel relation with the side bars 1, thus swinging the seat 18 through between the side bars 1, 1 and into the position shown in Figure 5, and it may be latched in that position by the latches 23.

Fitted into the upper ends of the tubes 10 are the side bars 24, 24 of the U-shaped handle, whose cross bar has a suitable grip member 25 thereon.

These side bars 24 are tubular and their inner sides are provided with openings to receive the dogs 14, shown in Figure 7.

When the device is used as a supplemental vehicle seat the dogs 14 are disengaged and the side bars 24 are telescoped into the side rods 10 as far as possible and as shown in Figure 5 whereupon the dogs 14 will engage in suitable openings in said side bars provided for the purpose and the spring latches 23 are released permitting the side rods 10 to be swung into parallel relation with the side bars 1, the seat 18 passing between said side bars and the spring latches 23 will re-engage to maintain the parts in that assembled position.

When it is desirable to use the device as a push-cart, the spring latches 23 may be released and the side bars swing into horizontal position as shown in Figure 1, thus carrying the sleeves 22 back to original position as shown in Figure 1 and said sleeves may be secured in said position. The side bars 24 may then be drawn out of the side rods 10 the required distance and secured in that position by the dogs 14 and the vehicle may then be conveniently used as a push-cart type of baby carriage.

What I claim is:

1. A seat construction comprising, a main frame having spaced side bars, V-shaped tubular side frames arranged in spaced parallel relation and pivoted at their apexes to the main frame to swing back and forth between said bars to positions on opposite sides of the main frame, releasable means securing said frames in a selected relation to said main frame, a seat suspended between the side frames, a U-shaped handle whose arms are telescopingly received in corresponding arms of the side frames, and latch means carried by said side frames and releasably engageable with said handle for securing the handle at any selected point of adjustment relative to the side frames.

2. A seat construction comprising, a main frame having spaced side bars, a brace connecting said side bars at one end, the other ends of said side bars being connected by a cross brace and being formed hook-shaped, substantially V-shaped side frames arranged in spaced parallel relation and pivoted at their apexes to the main frame to swing back and forth betweeen said bars to positions on opposite sides of and extending outwardly from the main frame a seat mounted between the side frames, links pivotally connected at one end to the side bars of the main frame, and latch means carried on corresponding arms of said side frames and pivotally connected to the other ends of said links for adjustably connecting the links to the side frames.

References Cited in the file of this patent

UNITED STATES PATENTS 2,435,733   Belyeu ---------------- Feb. 10, 1948

FOREIGN PATENTS 19,957   Germany -------------- Nov. 2, 1882
295,092   Italy ----------------- Apr. 13, 1932